United States Patent [19]

Nauta

[11] 4,367,905
[45] Jan. 11, 1983

[54] WHEELED SUPPORT ASSEMBLY FOR CONVEYORS WITH LOCKING AND FASTENING FEATURE

[75] Inventor: Randal W. Nauta, Wyoming, Mich.

[73] Assignee: C. L. Frost & Son, Inc., Grand Rapids, Mich.

[21] Appl. No.: 208,285

[22] Filed: Nov. 19, 1980

[51] Int. Cl.³ .................. F16C 33/80; F16C 43/04
[52] U.S. Cl. ................. 308/182; 308/187.2; 308/190; 308/191; 308/236
[58] Field of Search ............ 308/182, 187, 187.1, 308/187.2, 190, 191, 192, 236

[56] References Cited

U.S. PATENT DOCUMENTS

| | | | |
|---|---|---|---|
| 1,617,085 | 2/1927 | Specht. | |
| 2,117,988 | 5/1938 | Schock et al.. | |
| 2,512,148 | 6/1950 | Gaines | 308/16 |
| 2,976,089 | 3/1961 | Vogt. | |
| 3,086,826 | 4/1963 | Gunnell. | |
| 3,469,892 | 9/1969 | Langstroth | 308/16 |
| 3,553,765 | 1/1971 | Frost | 16/107 |
| 3,602,150 | 8/1971 | Frost et al. | 104/172 S |
| 3,971,601 | 7/1976 | Sytsma | 308/16 |
| 4,010,987 | 3/1977 | Jasperse et al. | 308/187 |
| 4,026,614 | 5/1977 | Neder | 308/189 R |
| 4,154,447 | 5/1979 | Francis, Jr. et al.. | |

FOREIGN PATENT DOCUMENTS 2834042 2/1979 Fed. Rep. of Germany.

OTHER PUBLICATIONS

Drawing 6280000 entitled "6 Trolley Wheel," dated 3/14/72, by C. L. Frost & Son, 2020 Bristol Ave., N.W., Grand Rapids, MI.

Primary Examiner—Lenard A. Footland
Attorney, Agent, or Firm—Price, Heneveld, Huizenga & Cooper

[57] ABSTRACT

A trolley or carriage assembly for conveyors, including overhead and in-floor conveyors, in which the inner race of a wheel assembly, a shield or seal for the wheel, and a support for supporting a work piece to be transported by the trolley or carriage assembly are simultaneously locked against rotation with respect to each other and a supporting and retaining shaft by the non-circular outer circumference of the shaft and corresponding non-circular apertures of the inner race, shield or seal and support. Preferably the shaft is a hexagonal, headed bolt or rivet which may include a relubrication passageway for use in closed, sealed wheels. The assembly provides better load distribution, easier assembly in and disassembly from conveyors, and longer, more durable and wear-resistant operation, especially with stamped, sheet metal trolley brackets.

35 Claims, 7 Drawing Figures

WHEELED SUPPORT ASSEMBLY FOR CONVEYORS WITH LOCKING AND FASTENING FEATURE

BACKGROUND OF THE INVENTION

In the operation of conveyor systems, and especially trolley wheel and support assemblies in overhead systems, including power and free systems, or trolley assemblies including wheeled carrier supports in floor conveyor systems, significant problems result from the rotation of the various parts in such assemblies during operation. Conventionally known bolts and/or rivets, which are typically used to secure trolley brackets to trolley wheel assemblies which ride on overhead conveyor tracks, have been relied on for a dual function of both retaining the various parts together and also keeping sufficient force, i.e., compression, on such parts to prevent their rotation during use. However, loosening of the various assembly parts around such bolts or rivets in operation causes rotation, and allows the parts to move axially apart from one another in the assembly, resulting in several problems. Such problems include the loss of full support for the ball or rolling elements in full ball complement trolley wheels, the premature wear and failure of the wheel support areas of trolley brackets, the premature wear and failure of the supporting shaft such as the rivet or bolt, and the inability to properly drain or remove contaminants from the wheel bearing assembly. In addition, prior known assemblies provided less than optimum load bearing capabilities and weight distribution within such assemblies.

A concurrent problem with prior known trolley assemblies was the lack of ability to easily assemble and disassemble the trolley wheel assembly from the support or trolley bracket in the overhead conveyor system. In many cases, it is desired to disassemble and replace a trolley wheel in an overhead system without removing the trolley brackets from the overhead conveyor chain and without disassembling the conveyor chain which is a laborious task. The problem is especially acute in fully closed or sealed wheel assemblies having lubrication seals or closure members completely enclosing the rolling element receiving area between the inner and outer races of such assemblies. Such assemblies may be either permanently lubricated or include relubrication features. In such situations, access to the supporting shaft, bolt or rivet is impossible because of the enclosed nature of the wheel assembly. Accordingly, there is no easy way to hold the bolt and remove the nut from the bolt to enable removal of the wheel assembly from the trolley bracket. In such cases, it was often necessary to remove the entire trolley bracket from the chain and remove one or more of the shields or closure members from the wheel in order to remove the wheel assembly from the trolley or support bracket.

An attempt at solving the above problems in a trolley bracket and wheel assembly is shown in U.S. Pat. No. 3,553,765. This assembly requires a special trolley bracket having a machined projection including flat surfaces which engage corresponding flat surfaces on a specially formed, lateral extension of a one piece inner race of a wheel assembly, as well as a shield member on one side of the wheel. A circular bolt extends through all of the parts and engages threads on the inner race to hold the parts together. This structure, however, cannot be used with stamped, sheet metal or conventional forged trolley brackets because of the required, specially formed bracket extension. Further, the use of multi-part inner races and full ball complement wheels is difficult with such structure because of the required, one piece inner race and lateral extension to prevent rotation. Also, a special locking washer engaging the bolt and bracket must be used to prevent bolt rotation. Load distribution is also less than optimum because the circular bolt cannot distribute loads over a wide base area. The provision of specially machined parts is also very expensive and detracts from the acceptance of the assembly.

Another trolley bracket and wheel assembly in which a portion of the various inner race and bracket parts are non-rotational is shown in U.S. Pat. No. 3,971,601. This structure does not include any shield or seal structure at all, let alone a shield structure which prevents rotation. Also, all parts of the inner race assembly are not positively prevented from rotating, especially if loosening of the assembly occurs. Further, load distribution is again less than optimum.

In one such system a small, separate key is fitted between a milled slot or keyway in a supporting shaft for a wheel on a four wheel carrier assembly and the inner race of a wheel, a shield member and a central support member or casting in such an assembly. The small key is very difficult to assemble and maintain, in addition to requiring a much greater exposure for machining various keyways and corresponding shapes in the mating parts. Moreover, such wheel assemblies require removal of closure/shield members before the assembly can be removed or disassembled, do not provide advantageous weight or load distribution, and rely greatly on the relatively small key which, if broken or distorted, cannot prevent the rotation and consequent loosening of the assembly discussed above. In actual practice, such keys and keyways have been found to have an unacceptable failure rate.

The present invention provides a solution to the above-noted problems in the support and use of trolley assemblies in various conveyor systems.

SUMMARY OF THE INVENTION

Accordingly, the present invention provides a trolley or carriage assembly for conveyors in which the inner race of a wheel assembly, a shield or seal for the wheel, and a support for supporting a work piece to be transported by the assembly, such as a trolley bracket, a central casting for a four-wheel carrier, or the like, are all simultaneously locked together and against rotation with respect to each other and a supporting and retaining shaft by the non-circular outer circumferential shape of the shaft. This invention eliminates the need for the supporting shaft to maintain sufficient compression on the assembled parts to prevent rotation only by frictional resistance between the parts because the non-circular circumference accomplishes that antirotational function regardless of the tightness of the parts. Moreover, the present invention also helps maintain the parts tightly together to prevent premature wear and failure.

In one aspect, the present invention is an improved trolley/carriage assembly for conveyors of the type including a plurality of rolling elements, outer race means and inner race means for supporting the rolling elements in a space therebetween to allow rotation of the outer race means with respect to the inner race means, and shield means adjacent at least one side of the race means for covering the space between the race means and shielding the rolling elements to resist their contamination with foreign matter. A support means is also included for supporting an object to be transported on the assembly along with shaft means for securing together and supporting the inner race means, shield means and support means. The improvement resides in the shaft means having a non-circular outer circumference while the inner race means, shield means and support means each include a non-circular aperture therethrough corresponding in shape to the shaft means. The shaft means extend through the respective apertures to simultaneously lock the inner race means, shield means and support means against rotation with respect to one another and the shaft means. Retaining means are spaced along the shaft means to hold the inner race means, shield means and support means together on the shaft means.

In other aspects of the invention, the outer circumference of the shaft means and corresponding apertures in the other parts include non-circular surfaces such as at least one flat, planar surface. When such surfaces are positioned at the bottom of the shaft means, any weight and load on the assembly is evenly distributed over the surfaces. Further the support means may be a trolley bracket and especially a bracket stamped from sheet metal material, a spacer or collar may be included between the support or bracket and the shield means and received over the shaft means, and the shaft means itself may have a hexagonal configuration.

In yet other aspects, the shield means may include a labyrinth seal assembly on one side of the assembly. A full closure member may be included on the other side and is rotational with the outer race means. In addition, a lubrication passageway may be provided through the shaft for relubrication of the wheel assemblies. The inner race means may also be formed from one or more members depending on whether the wheel assembly is a full ball complement wheel or a retainer-type wheel.

The present invention overcomes numerous disadvantages of prior known assemblies noted above. The non-circular cross-sectional shape of the supporting shaft prevents rotation between the trolley bracket, non-rotating shield members and inner race parts thereby promoting less wear, longer life and a smaller failure rate for the assembly. The shaft means in the present invention need not compress the various parts together to prevent rotation. Additional, small parts requiring expensive machining operations and difficult assembly procedures such as keys and keyways, are avoided. A weep or drainage hole, in the shield or seal assembly, to remove foreign matter and liquids from the interior of the wheel assembly, is automatically retained at the bottom during assembly because of the non-rotational engagement with the support shaft. In full ball complement wheels including several inner race parts, full support for the ball rows and elimination of any rotation of the inner race parts is provided. In addition, a simple antirotational structure is provided which is especially useful in stamped trolley brackets which include less material in the wheel supporting areas while maintaining the ability to prevent any rotation of the bracket, non-rotating shield and inner race parts with respect to the shaft. The invention also allows the use of smaller lighter rivets and/or fastening bolts since such parts are not relied upon to maintain non-rotation between the parts. Further, the non-circular shaft better distributes the load born by the assembly over a surface area as opposed to a line as was previously known with circular support shafts. Finally, the assembly promotes easier assembly and disassembly of the wheel structure from the support or trolley bracket, especially with closed or permanently lubricated wheels where access to the bolt is no longer necessary, because the bolt is automatically locked against rotation allowing simple removal of any fastener without special tools or procedures to disassemble the support or bracket from the conveyor system.

These and other objects, advantages, purposes and features of the invention will become more apparent from a study of the following description taken in conjunction with the drawings.

DESCRIPTION OF THE PREFERRED EMBODIMENTS

Figures 1, 4, 5:
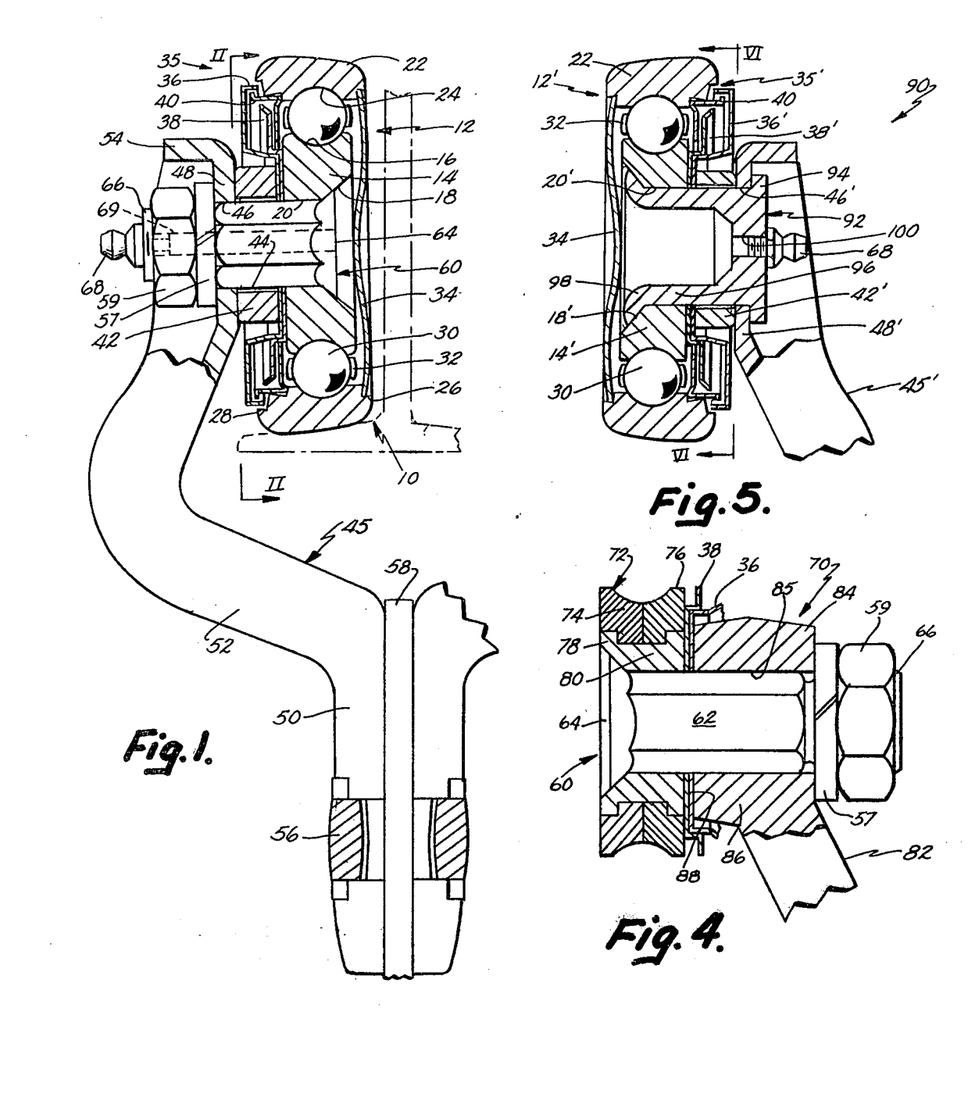
FIG. 1 is a fragmentary, end elevation with portions shown in section of one embodiment of the present trolley assembly invention including a retainer-type trolley wheel assembly secured to a stamped, sheet metal trolley bracket by a non-circular, hexagonal threaded bolt.
FIG. 4 is an enlarged, end elevation of a portion of a second embodiment of the present trolley assembly invention illustrating a modified inner race and trolley bracket structure with portions shown in section.
FIG. 5 is a fragmentary, end elevation of a third embodiment of the present trolley assembly invention with portions shown in section including a trolley wheel assembly permanently secured to a stamped, sheet metal trolley bracket with a non-circular, hexagonal rivet.
Figure 2:
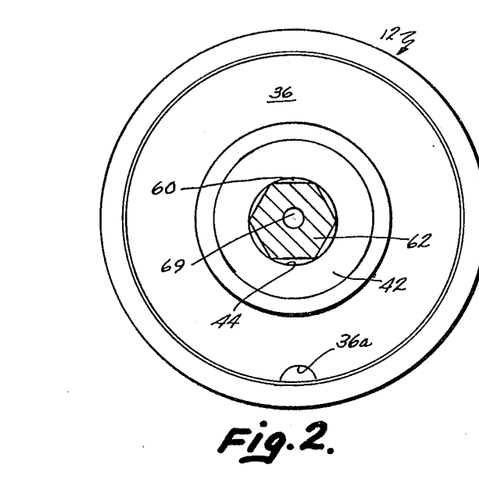
FIG. 2 is a sectional side elevation of the trolley assembly of FIG. 1 taken along plane II—II of FIG. 1.
Figure 3:
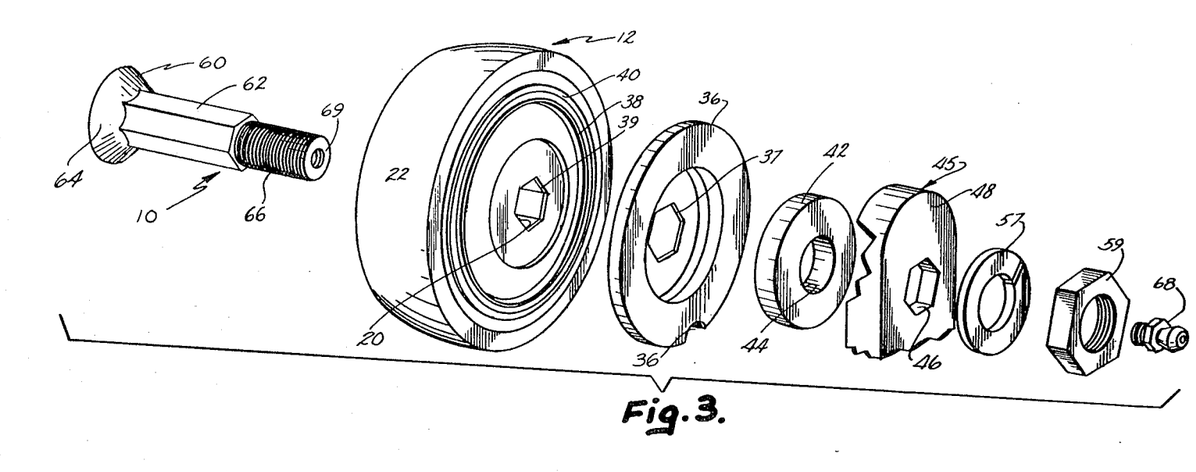
FIG. 3 is an exploded, perspective view of the trolley assembly of FIGS. 1 and 2.

Referring now to the drawings in greater detail, FIGS. 1–3 illustrate a first embodiment 10 of the present trolley assembly invention including a trolley wheel assembly 12 non-rotationally secured to a support or trolley bracket 45 by means of a non-circular support and retaining shaft or bolt 60. Trolley assembly 10 is designed for support and movement along a conventional I-beam overhead conveyor track (shown in phantom in FIG. 1) such that a pair of such assemblies are secured in alignment on either side of the central vertical web of such a track. FIG. 1 illustrates the manner in which a pair of the brackets 45 are inserted in the middle of a center link 56 of an overhead conveyor chain and spaced apart by a downwardly extending spacer or attachment 58 from which a work piece may be hung or suspended. Brackets 45 curve upwardly and around the lower wheel supporting flanges of the I-beam track to support wheel assemblies 12 generally at a slight angle from the horizontal thereon. The track, spacer or attachment 58, and chain 56 form no part of the present invention.

Trolley wheel assembly 12 includes a single inner race member 14 preferably machined from steel and case hardened or otherwise treated having a partially circular inner raceway 16 on its outer circumference and a countersunk, conical recess 18 leading to a central opening 20 on one side. Opening 20 has a non-circular shape, preferably that of a regular polygon such as a hexagon, designed to match and slip over a correspondingly shaped support shaft or bolt 60 as will be more fully described below. An outer race 22 is preferably also machined from steel and case hardened and includes a partially circular outer raceway 24 on its inner circumference radially aligned but spaced outwardly from inner raceway 16. Outer race member 22 also includes a crowned outer circumference engaging the slope of the I-beam track, and stepped, annular recesses or shoulders 26, 28 for receipt of a closure member 34 on the same side as inner race recess 18 and a portion of a labyrinth seal assembly 35 on the opposite or bracket side of inner race 14. Since inner race member 14 is one piece, a series of spherical ball bearing rolling elements is received between and within raceways 16, 24 to rotationally support outer race 22 with respect to the inner race 14. Balls 30 are spaced apart and retained in their spaced relationship by a conventional cage or retainer 32.

As shown in FIG. 1, annular recess 26 receives a closure disc member 34 which covers one end of the inner race member on the same side as recess 18 along with the space between inner and outer race members 14, 22 to prevent the entry of foreign matter into the bearing area. Closure member 34, which is initially a dome shaped disc, is flexed or "oil-canned" into place in the annular recess 26 for secure retention.

On the side of wheel assembly 12 opposite to closure member 34 is the labyrinth seal assembly 35. Seal assembly 35 includes an outer stepped or configured, annular shield or seal member 36, an intermediate, annular, stepped shield or seal member 38 and an inner annular generally L-shaped seal or shield member 40. Outer and intermediate shield or seal members 36, 38 each include a non-circular, preferably hexagonal aperture 37, 39 respectively (FIG. 3) corresponding to and adapted to slide over and telescope on shaft or bolt 60 in the same manner as does inner race member 14. Seal members 36, 38 both extend radially outwardly from shaft 60 toward the outer race but include axially extending portions such that each includes portions spaced respectively outwardly of the inner seal member 40. Seal 40 is retained in a portion of annular stepped recess 28 on the side of the outer race 22 opposite from closure member 34, as shown in FIG. 1. The radially extending flanges of the seal members 36, 38, 40 respectively overlap one another at spaced locations to form a labyrinth path through which any foreign matter must pass before entry into the bearing area of the wheel assembly. Shield 36 also includes a semi-circular weep hole or drainage aperture 36a aligned with one of the flats in hexagonal aperture 37. When slipped over bolt shank 62 with the non-circular aperture at the bottom, weep hole 36a is retained at the bottom of wheel assembly 12 in radial alignment with the bottom of bolt 60 so that any foreign matter or liquids entrapped within the wheel assembly can drain out properly. The overall seal assembly 35, except for its method of securement to shaft 60 as in the present invention, is as shown and described in U.S. Pat. No. 3,537,725, assigned to the same assignee as the present application, the disclosure of which is hereby incorporated by reference herein.

Also telescoped over shaft or bolt 60 is a spacing member or collar 42 forming an annular ring having radially extending side surfaces and a width slightly wider than the axial width of seal member 36. Collar or ring 42 includes a circular central aperture unlike inner race member 14, or seal members 36, 38, because it need not be prevented from rotating with respect to the shaft or bolt 60. In any event, compression force between bracket 45 and seal member 40, when the wheel assembly is attached to the bracket, will normally prevent rotation of the collar.

As is best seen in FIG. 1, support member or trolley bracket 45 is telescoped over shaft or bolt 60 outboard of spacer or collar 42 by means of a noncircular, preferably hexagonal aperture 46 equivalent in size to those in inner race member 14 and seal members 36, 40. Bracket 45 is stamped from sheet metal and includes a generally planar, wheel supporting area 48, a chain link engaging end 50 and an intermediate connecting portion 52 which is designed to curve upwardly and outwardly around the I-beam support track for the trolley assembly. Bracket 45 also includes an outwardly extending peripheral or marginal edge flange 54 which stiffens and strengthens the bracket. Bracket 45 may be any one of the various embodiments of trolley brackets shown in U.S. Pat. Nos. 4,220,243, 4,210,238, or copending United States Patent applications Ser. No. 872,265, filed Jan. 25, 1978, invented by Gerald W. Gurney and Siegfried K. Weis; Ser. No. 3,963, filed Jan. 17, 1979, invented by Charles C. Frost, Gerald W. Gurney and Frederick R. Sytsma; or Ser. No. 3,964, filed Jan. 17, 1979, invented by Charles C. Frost and Siegfried K. Weis, all of which are commonly owned by the assignee of the present application and the disclosures of all of which are hereby incorporated by reference herein.

Of course, other support members such as castings or carriages for multi-wheel carriers in power and free overhead conveyors and/or in-floor conveyors can also be used with the present invention.

As is best seen in FIGS. 1 and 3, support shaft or bolt 60 includes shank or body portion 62, has the shape of a regular polygon, in this case a hexagon, an integral head having a conical under surface 64, and an extending, threaded end portion 66. The shank 62 has a series of elongated flat, planar areas forming an outer circumference having the cross-sectional hexagon shape. Other non-circular shapes, i.e., triangular, square, rectangular, pentagonal, or other polygons could also be used. Shank 62 can also include but a single non-circular area, such as a flat, planar area while apertures 20, 37, 39 and 46 would, in that case, include but a single correspondingly located flat area.

Trolley wheel assembly 12, seal members 36 and 38, spacer collar 42, and bracket 45 are assembled on support shaft or bolt 60 by first telescoping inner race member 14 over the threaded end portion 66 of bolt 60 such that conical head surface 64 seats in the correspondingly shaped conical recess 18 on the inner race. Seal member 40 is secured in outer race 22 prior to such assembly. Thereafter, seal members 38 and 36 are respectively telescoped over the hexagonal shank 62 of bolt 60 such that they abut against one another and against the flat or planar side surface of inner race member 14 opposite the side on which recess 18 is included. Collar 42 is then telescoped over shank 62 and against the flat or planar inner radial area of seal member 36, following which wheel support area 48 of bracket 45 is telescoped over hexagonal shank 62.

As will be understood from FIG. 1, the length of the hexagonal shank area 62 is slightly shorter than the combined widths of the inner race member 14 at the inner end of recess 18, seal members 36, 38, collar 42 and wheel support area 48 of bracket 45. A lock washer 57 and a threaded nut 59 are threaded on the end 66 of the bolt 60 to complete the assembly. Upon tightening, nut 59 forces bracket 45, collar 42, seal members 36, 38 and inner race member 14 against head 64 of bolt 60 to retain them tightly in engagement with one another. Rotation of race member 14, seals 36, 38 and bracket 45 with respect to bolt 60 and one another is prevented by the interengagement of non-circular apertures 20, 37, 39 and 46 with the non-circular outer circumferential surface of the bolt shank 62. Rotation of collar 42 is resisted by its engagement between bracket area 48 and the inner radial area of seal 36. Also bracket 45 and seal 36 do not rotate. Since the width of collar 42 is slightly wider than the overall axial extent or width of seal member 36, the bracket wheel support area 48 is spaced away from the seal 36 and therefore does not contact or interfere with its operation.

The final step in the assembly is to support the wheel and bracket structure on an appropriate support tool such as that disclosed in copending United States patent application Ser. No. 165,292, filed July 2, 1980, incorporated by reference above, and to secure closure member 34 in annular recess 26 on the outer side of wheel assembly 12. The securement of closure member 34 effectively prevents the removal of bolt 60 from the assembly even if the nut 59 and washer 57 are removed and the entire wheel assembly 12 is removed from bracket 45.

Trolley wheel assembly 12 may be relubricated by insertion of grease or other lubricant through a conventionally known Zerk-type grease fitting 68 secured in an axially extending bore or lubricant passageway 69 extending along the central axis of bolt 60. Lubricant passes through passageway 69 into the space between bolt head 64 and closure member 34 and moves radially outwardly to the space between the raceways 16, 24 for proper lubrication of the rolling elements 30.

Referring now to FIG. 4, a modified embodiment 70 of the trolley assembly is shown wherein like numerals indicate like parts to embodiment 10. Embodiment 70 includes the same outer race member (not shown) and shield or seal members (not fully shown), as described above in connection with FIGS. 1-3. However, a modified inner race assembly 72 is included having left and right annular, inner race rings 74, 76 together forming a partially circular inner raceway 77. Each ring 74, 76 includes a central circular bore and an annular recess on the outer side communicating with that bore for receiving the securing flanges 78 of an annular hub 80 which retains the inner race parts together after insertion of a full complement of balls (not shown) which eliminate the need for a cage or retainer as was used at 32 in the assembly 10. Hub 80 includes a preferably hexagonal aperture 81 adapted to slide over and fit closely around bolt shank 62, as well as a conical recess 83 for receiving bolt head 64.

Embodiment 70 also includes a different, forged trolley bracket 82 including a wheel support head 84 having a non-circular, preferably hexagonally shaped aperture 85 therethrough. Head 84 includes an outwardly extending projection 86 having a radially extending, planar face surface which abuts against the inner radial area of outer seal member 36 to clamp the seal members 36 and 38 against the planar side surface of inner race assembly 72 as shown in FIG. 4. The supporting shaft or bolt 60 is the same as that described above in connection with assembly 10. The assembly procedure for the entire assembly 70 is the same as that for assembly 10 except that the need for a spacer collar 42 is eliminated because of the projecting face 86 on forged bracket 82. Further, the three member inner race assembly 72 is telescoped over bolt 60 and against head 64 in the same manner as is single piece inner race member 14 in embodiment 10.

The assembly procedure for assemblies 10 and 70 illustrates an important advantage of the present invention. That is, when it is desired to remove wheel assembly 12 from bracket 45 after the entire assembly has been installed in an overhead conveyor system, a workman need merely loosen nut 59 with an appropriate wrench and need not worry about holding bolt 60 against rotation during such loosening. Access to hold such bolt would be prevented in any event by closure member 34. Such rotation will automatically be prevented by the engagement of the hexagonal bolt with the hexagonal aperture 46 in bracket 45 which bracket will, at that time, be secured in a chain link 56 in the overhead conveyor system. Thus, wheel assembly 12, including bolt 60, may be easily removed from the bracket without removing bracket 45 from chain 56 and the overall conveyor system thereby greatly decreasing maintenance time and allowing immediate replacement of wheel assembly 12 without disassembly of the bracket from the chain.

Figure 6:
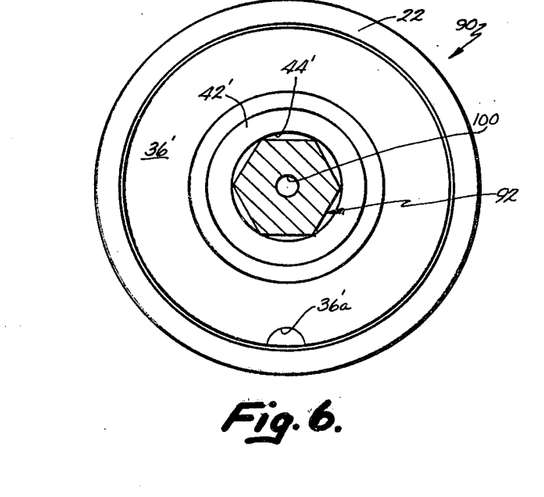
FIG. 6 is a sectional, side elevation of the trolley assembly taken along plane VI—VI of FIG. 5.
Figure 7:
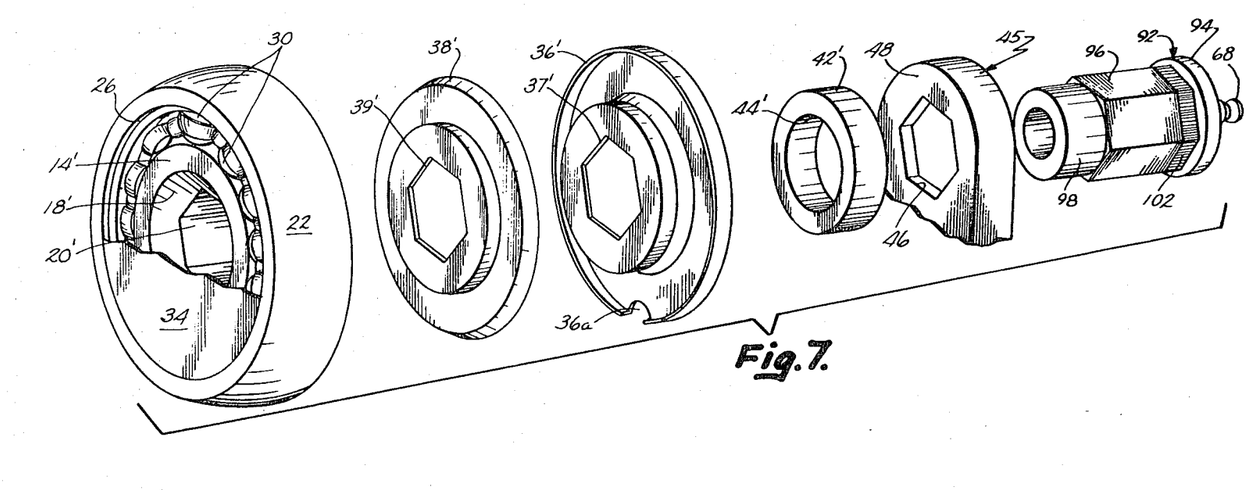
FIG. 7 is an exploded, perspective view of the trolley assembly of FIGS. 5 and 6.

Referring now to FIGS. 5-7, a third embodiment 90 of the trollery assembly is shown wherein like numerals indicate like parts to those previously described. In this case, a closed trolley wheel assembly 12' is used wherein outer race member 22, ball members 30, retainer cage 32, shield or seal member 40, as well as closure member 34 are all identical to those previously described. Inner race member 14' and seal members 36', 38' and 40' are very similar to inner race member 14, and seal members 36, 38 except that they include larger, hexagonal apertures 20', 37' and 39' extending therethrough. Inner race member 14' has a conical recess 18' merging with the aperture 20'. In addition, spacer collar 42' is of the same width as spacer collar 42 but includes a larger circular aperture 44', best seen in FIG. 7. Stamped trolley bracket 45', including wheel support area 48', has a larger hexagonal opening 46'. All of the hexagonal apertures and circular apertures through the various parts in assembly 90 are larger because of the use of larger support rivet 92 having an integral head 94 and a shank portion 96 which is larger than bolt shank 62 and has a series of rectangular, flat or planar areas extending around its circumference to form the hexagonal cross-sectional shape matching that of the apertures through the various parts. Smaller rivets may also be used. Rivet 92 also includes an extending, formable end portion 98 which is permanently deformed or formed over to retain inner race member 14', seal members 36', 38', spacer collar 42' and bracket 45' tightly against rivet head 94. Once formed over or rolled over, end 98 permanently retains the various parts together against head 94 such that rivet 92 must be broken or destroyed to disassemble the assembly 90. Closure member 34 is secured on outer race member 22 after rivet 92 is permanently installed through the various parts.

As shown in FIG. 5, the interior of rivet 92 is hollow. An axial extending, central circular passageway or bore 100, having a conventional Zerk-type grease fitting 68 inserted therein, leads to that hollow rivet interior. Lubricant may be inserted through the permanently installed rivet 92 by means of Zerk fitting 68 and passageway 100 to the interior of the closed wheel 12'. The exterior circumference of the shank 96 or rivet 92 also includes ribs or serrations in a band 102 extending around the circumference immediately adjacent the inside surface of head 94 to help retain the rivet on the bracket during assembly.

In the various embodiments 10, 70 and 90, various parts of the wheel assembly not otherwise specified above are typically formed from metal by either machining or stamping as required. Of course the brackets 45 and 45' are stamped from sheet metal via conventional transfer press or progressive die stamping processes, while bracket 82 is forged with conventionally known forging processes.

It will now be understood that the present invention tightly and non-rotationally secures simultaneously the inner race member or members, shield or seal members, a spacer or collar, if any, as well as the bracket or support in a trolley or carriage assembly for use in conveyors, and especially overhead or floor conveyors. The flat surfaces on the bottom and other exterior areas of the support shaft, bolt or rivet help distribute the loads supported by the assembly to the track more evenly as compared to prior known cylindrical support shafts which support the weight along a line contact. In addition, the stress placed on the support shaft in compression need not be nearly as great since that force is not now relied upon for preventing rotation of the various parts. The present invention does not interfere with relubrication structures, contributes to reduced wear and longer life for the overall assembly, and allows use of smaller less bulky parts. Also, the present invention greatly eases assembly and disassembly since, even with closed or permanently lubricated wheels, support shafts having removable fasteners need not be held or secured against rotation during removal of the fastener because such holding or rotation resistance occurs automatically.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. In a wheeled support assembly for conveyors including a plurality of rolling elements, outer race means and inner race means for supporting said rolling elements in a space therebetween to allow rotation of said outer race means with respect to said inner race means, shield means adjacent at least one side of said race means for covering said space between said race means and shielding said rolling elements to resist their contamination with foreign matter, support means for supporting an object to be transported on said assembly, and shaft means for securing together and supporting said inner race means, shield means and support means, the improvement comprising:

said shaft means having a non-circular outer circumference; sand inner race means, shield means and support means each including a non-circular aperture therethrough corresponding in shape to said shaft means; said shaft means extending through said respective apertures to simultaneously lock said inner race means, shield means and support means against rotation with respect to one another and said shaft means; retaining means spaced along said shaft means for holding said inner race means, shield means and support means together on said shaft means;

at least a portion of said shield means abutting against said one side of said inner race means;

said assembly also including a spacing member intermediate said support means and said portion of said shield means; said retaining means tightly securing said support means against said spacer and said spacer against said portion of said shield means;

said retaining means including a head at one end of said shaft means; said shaft means having a threaded portion at the opposite end from said head, said head abutting said inner race in opposition to said one side, said threaded portion of said shaft means projecting beyond said support means; said retaining means also including a threaded fastener received on said threaded portion.

2. The wheeled support assembly of claim 1 including a closure member secured to said outer race means and covering said space between said outer race means and one end of said inner race means on the other side of said assembly opposite to said one side, said closure member preventing access to said other side and removal of said shaft means from said inner race means; said non-circular circumference of said shaft means allowing tightening and loosening of said threaded fastener on said shaft means without access to or holding said shaft means.

3. The wheeled support assembly of claim 2 wherein said shaft means includes lubrication passageway means for inserting lubricant through said shaft means to the space between said race means.

4. The wheeled support assembly of claim 1 wherein said head on said one end of said shaft means is received in a recess in said one side of said inner race means.

5. In a wheeled support assembly for conveyors including a plurality of rolling elements, outer race means and inner race means for supporting said rolling elements in a space therebetween to allow rotation of said outer race means with respect to said inner race means, shield means adjacent at least one side of said race means for covering said space between said race means and shielding said rolling elements to resist their contamination with foreign matter, support means for supporting an object to be transported on said assembly, and shaft means for securing together and supporting said inner race means, shield means and support means, the improvement comprising:

said shaft means having a non-circular outer circumference; said inner race means, shield means and support means each including a non-circular aperture therethrough corresponding in shape to said shaft means; said shaft means extending through said respective apertures to simultaneously lock said inner race means, shield means and support means against rotation with respect to one another and said shaft means; retaining means spaced along said shaft means for holding said inner race means, shield means and support means together on said shaft means;

at least a portion of said shield means abutting against said one side of said inner race means;

said assembly also including a spacing member intermediate said support means and said portion of said shield means; said retaining means tightly securing said support means against said spacer and said spacer against said portion of said shield means; said spacer being an annular collar telescoped over said shaft means; said collar having a circular aperture therethrough.

6. In a wheeled support assembly for conveyors including a plurality of rolling elements, outer race means and inner race means for supporting said rolling elements in a space therebetween to allow rotation of said outer race means with respect to said inner race means, shield means adjacent at least one side of said race means for covering said space between said race means and shielding said rolling elements to resist their contamination with foreign matter, support means for supporting an object to be transported on said assembly, and shaft means for securing together and supporting said inner race means, shield means and support means, the improvement comprising:

said shaft means having a non-circular outer circumference; said inner race means, shield means and support means each including a non-circular aperture therethrough corresponding in shape to said shaft means; said shaft means extending through said respective apertures with said inner race means, shield means and support means engaging said shaft means to simultaneously lock said inner race means, shield means and support means against rotation with respect to one another and said shaft means; retaining means spaced along said shaft means for holding said inner race means, shield means and support means together on said shaft means.

7. The wheeled support assembly of claim 6 wherein at least a portion of said shield means abuts against said one side of said inner race means; said assembly also including a spacing member intermediate said support means and said portion of said shield means; said retaining means tightly securing said support means against said spacer and said spacer against said portion of said shield means.

8. The wheeled support assembly of claim 7 wherein said spacer is an annular collar telescoped over said shaft means.

9. The wheeled support assembly of claim 1 wherein said shaft means includes lubrication passageway means for inserting lubricant through said shaft means to the space between said race means.

10. The wheeled support assembly of claim 1 wherein said shaft means and retaining means comprise a rivet having a head at one end, a deformed opposite end, and a non-circular outer circumference between said ends.

11. The wheeled support assembly of claim 10 including said shield means on both sides of said inner race means, said rivet including lubrication passageway means for inserting lubricant through said rivet to the space between said race means.

12. The wheeled support assembly of claim 10 or claim 11 wherein said support means includes a trolley bracket; a spacer intermediate said bracket and shield means on said one side of said inner race means; said head end of said rivet engaging said bracket, said formed-over end engaging a recess in the side of said inner race means opposite said one side.

13. The wheeled support assembly of claim 1 wherein the outer circumference of said shaft means has the cross-sectional shape of a polygon; said non-circular apertures also having a corresponding shape of a polygon for receipt over said shaft means.

14. The wheeled support assembly of claim 13 wherein said outer circumference of said shaft means has a hexagonal cross-sectional shape; said non-circular apertures also being hexagonal in shape for receipt over said shaft means.

15. The wheeled support assembly of claim 1 wherein said outer circumference of said shaft means includes at least one flat surface extending therealong; said non-circular apertures also having at least one correspondingly positioned flat surface for receipt over and engagement with said flat surface on said shaft means.

16. The wheeled support assembly of claim 15 wherein said flat surface on said shaft means is positioned at the bottom of said shaft means during use such that any weight and load supported by said assembly will be supported over said entire flat surface of said shaft means.

17. The wheeled support assembly of claim 1 wherein said shield means include at least one annular shield member including said non-circular aperture, abutting said one side of said inner race means, and extending radially outwardly from said shaft means toward said outer race means.

18. The wheeled support assembly of claim 17 including a second annular shield member secured to and rotatable with said outer race means, projecting radially toward said shaft means, and overlapping said one shield member; and a third annular shield member including a non-circular aperture adapted to receive said shaft means; said third shield member abutting said one annular shield member, projecting radially outwardly toward said outer race means, and overlapping said one and said second shield members to form a labyrinth seal assembly over said one side of said inner race means.

19. The wheeled support assembly of claim 17 wherein said shield member includes a weep opening adjacent its outer edge, said weep opening being positioned downwardly for optimum drainage and said shield member held against rotation from said position by said non-circular aperture and non-circular shaft means.

20. The wheeled support assembly of claim 1 wherein said shield means includes a labyrinth seal assembly on one side of said inner race means having overlapping seal members which resist the entry of foreign matter into said space between said race means, said labyrinth seal assembly having at least one shield member having said non-circular aperture, received on said shift means, and projecting outwardly toward said outer race.

21. The wheeled support assembly of claim 1 wherein said support means is a trolley bracket having one end including said non-circular aperture, a second end for receiving a link of a conveyor chain to move said assembly with the chain, and an intermediate, connecting portion between said two ends.

22. The wheeled support assembly of claim 21 wherein said bracket is stamped from sheet metal, said one bracket end having a recessed area receiving a portion of said retaining means.

23. The wheeled support assembly of claim 21 wherein said one end includes a projection having a surface which engages and holds said shield means against said inner race means.

24. The wheeled support assembly of claim 1 wherein said inner race means includes a pair of cooperating race members forming an inner raceway for said rolling elements, and a hub engaging and securing said race members together and having said non-circular aperture therethrough receiving said shaft means.

25. A trolley assembly for overhead conveyors comprising:
a plurality of rolling elements;
outer race means and inner race means for supporting said rolling elements in a space therebetween to allow rotation of said outer race means with respect to said inner race means;
a closure member secured to and rotatable with said outer race means and covering said space between said races and the entirety of one end said inner race means on one side thereof;
shield means on the side of said inner race means opposite one side for covering said space between said race means and restricting the entry of foreign matter between said races;
support means for suspending an object to be transported on said assembly;
headed shaft means havng a head at one end, removable retaining means at the opposite end, and a non-circular outer circumferential shape for supporting said inner race means, shield means, and support means; said inner race means, shield means and support means each including a non-circular aperture receiving said headed shaft to simultaneously prevent rotation of said inner race means, shield means and support means with respect to said headed shaft means;
said head on said shaft means being inaccessible from the exterior of said assembly and preventing removal of said shaft means after securement of said closure member on said outer race, the engagement between said non-circular shaft means and said support means enabling attachment and removal of said retaining means without access to said head end or additional retention of said shaft means.

26. The trolley assembly of claim 25 including lubrication passageway means for inserting lubricant through said shaft means into the space between said race means.

27. The trolley assembly of claim 25 including a spacer member received over said shaft means intermediate said support means and said shield means on said one side of said inner race means.

28. The trolley assembly of claim 25 or claim 27 wherein said support means is a trolley bracket.

29. In a trolley assembly for overhead conveyors including a plurality of rolling elements, outer race means and inner race means for supporting said rolling elements in a space therebetween to allow rotation of said outer race means with respect to said inner race means, support means for suspending an object to be transported on said assembly, and shaft means for securing together and supporting said inner race means and support means, the improvement comprising:
said shaft means including at least one surface which is non-circular when viewed in cross section extending along its outer circumference; said inner race means and support means each including a non-circular aperture therethrough having a non-circular surface corresponding to and positioned to be in alignment and engagement with said non-circular surface on said shaft means when said inner race means and support means are received on said shaft means to simultaneously lock said inner race means and support means against rotation with respect to one another and said shaft means; retaining means spaced along said shaft means for holding said inner race means and support means together on said shaft means.

30. The trolley assembly of claim 29 wherein said non-circular surfaces on said shaft means and apertures are flat, planar surfaces which are positioned at the bottom of said shaft means during use such that any weight and load supported by said assembly will be supported over said flat, planar surfaces.

31. The trolley assembly of claim 29 or claim 30 including shield means adjacent at least one side of said race means for covering said space between said race means and shielding said rolling elements to resist their contamination with foreign matter, said shield means also supported on said shaft means between said inner race means and support means, said improvement further comprising said shield means including a non-circular aperture therethrough having a non-circular surface corresponding to and positioned to be in alignment with said non-circular surface on said shaft means when received on said shaft means; said retaining means holding said shield means on said shaft means with said inner race means and support means.

32. In a wheeled support assembly for conveyors including a plurality of rolling elements, outer race means and inner race means for supporting said rolling elements in a space therebetween to allow rotation of said outer race means with respect to said inner race means, shield means adjacent at least one side of said race means for covering said space between said race means and shielding said rolling elements to resist their contamination with foreign matter, support means for supporting an object to be transported on said assembly, and shaft means for securing together and supporting said inner race means, shield means and support means, the improvement comprising:
said shaft means having a non-circular outer circumference; said inner race means, shield means and support means each including a non-circular aperture therethrough corresponding in shape to said shaft means; said shaft means extending through said respective apertures to simultaneously lock said inner race means, shield means and support means against rotation with respect to one another and said shaft means; retaining means spaced along said shaft means for holding said inner race means, shield means and support means together on said shaft means;
said retaining means including a head at one end of said shaft means; said shaft means having a threaded portion at the opposite end from said head, said head abutting said inner race in opposition to said one side, said threaded portion of said shaft means projecting beyond said support means; said retaining means also including a threaded fastener received on said threaded portion.

33. The wheeled support assembly of claim 32 including a closure member secured to said outer race means and covering said space between said outer race means and one end of said inner race means on the other side of said assembly opposite to said one side, said closure member preventing access to said other side and removal of said shaft means from said inner race means; said non-circular circumference of said shaft means allowing tightening and loosening of said threaded fastener on said shaft means without access to or holding said shaft means.

34. The wheeled support assembly of claim 33 wherein said shaft means includes lubrication passageway means for inserting lubricant through said shaft means to the space between said race means.

35. The wheeled support assembly of claim 32 wherein said head on said one end of said shaft means is received in a recess in said one side of said inner race means.

* * * * *

UNITED STATES PATENT AND TRADEMARK OFFICE
CERTIFICATE OF CORRECTION

PATENT NO. : 4,367,905

DATED : January 11, 1983

INVENTOR(S) : Randal W. Nauta

It is certified that error appears in the above-identified patent and that said Letters Patent is hereby corrected as shown below:

Column 2, line 27:

"exposure" should be --expense--

Column 9, line 63:

"sand" should be --said--

Column 12, line 49:

"shift" should be --shaft--

Column 13, line 15:

after "opposite" insert --said--

Column 13, line 20:

"havng" should be --having--

Signed and Sealed this

Twelfth Day of April 1983

[SEAL]

Attest:

GERALD J. MOSSINGHOFF

Attesting Officer

Commissioner of Patents and Trademarks